Sept. 13, 1955  J. F. SCHENCK  2,717,531
TELESCOPING VEHICLE REAR VIEW MIRROR ASSEMBLY
Filed Oct. 10, 1952
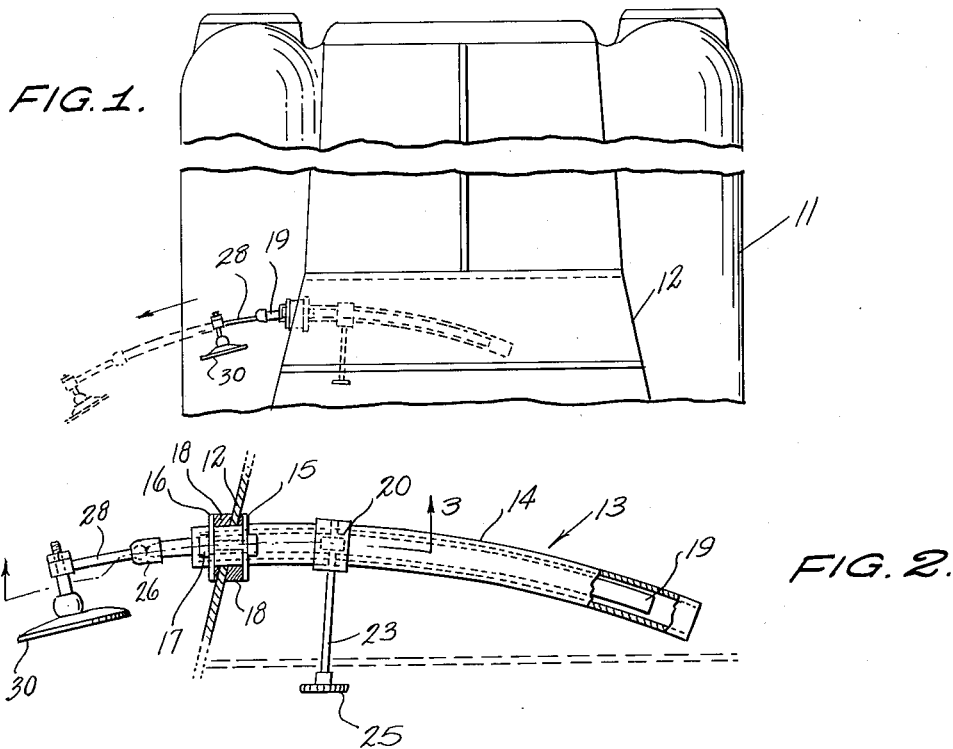
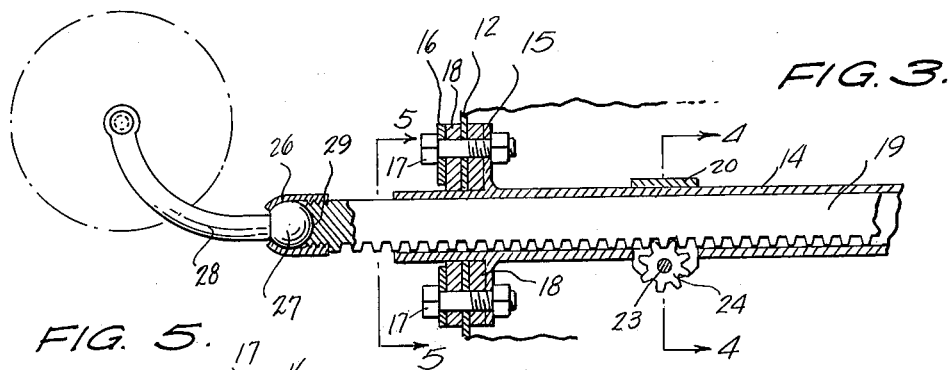
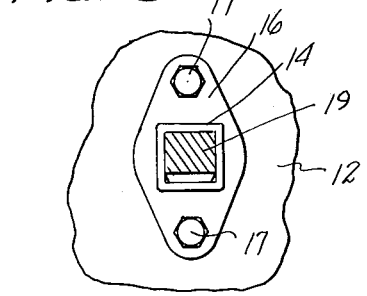
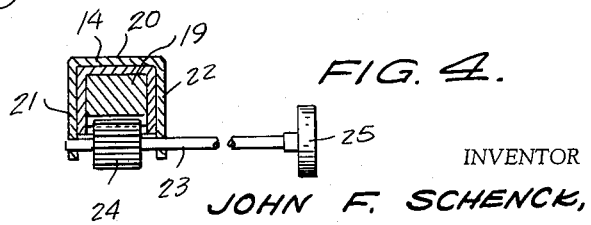
INVENTOR
JOHN F. SCHENCK,
BY
McMorrow, Berman & Davidson
ATTORNEYS United States Patent Office 2,717,531
Patented Sept. 13, 1955

2,717,531
TELESCOPING VEHICLE REAR VIEW MIRROR ASSEMBLY

John F. Schenck, Molalla, Oreg.

Application October 10, 1952, Serial No. 314,118

1 Claim. (Cl. 88—93)

This invention relates to mirrors for motor vehicles, and more particularly to an extensible rear view mirror.

The main object of the invention is to provide a novel and improved rear view mirror of the extensible type, said mirror being simple in construction, being easy to mount on a vehicle, and being easy to manipulate to vary the degree of lateral extension thereof relative to the vehicle, whereby the driver of the vehicle may readily obtain a clear view rearwardly of said vehicle.

A further object of the invention is to provide an improved rear view mirror of the laterally extensible type, said mirror involving inexpensive components, being easily adjustable to a desired position, and being rugged in construction.

Further objects and advantages of the invention will become apparent from the following description and claim, and from the accompanying drawings, wherein:

Figure 1 is a fragmentary top plan view of a motor vehicle provided with an improved laterally extensible rear view mirror constructed in accordance with the present invention.

Figure 2 is an enlarged horizontal cross sectional view of a portion of the motor vehicle showing the improved mirror, partly in plan view, and partly in horizontal section.

Figure 3 is an enlarged cross sectional view taken on the line 3—3 of Figure 2.

Figure 4 is a cross sectional detail view taken on the line 4—4 of Figure 3.

Figure 5 is a cross sectional detail view taken on the line 5—5 of Figure 3.

Referring to the drawings, 11 designates a motor vehicle of conventional construction having the cowling 12. Designated generally at 13 is an improved extensible rear view mirror assembly constructed in accordance with the present invention, said assembly comprising an elongated, sleeve-like housing 14 which is arcuate in plan, as is clearly shown in Figure 2, and which is secured horizontally to a side wall of the cowling 12, the end portion of the housing 14 extending through the cowling side wall. Rigidly secured to the outer end portion of the housing 14 is the generally oval flange 15, and slidably engaged around the housing is the opposing, generally oval flange 16, the flanges being clampingly connected by top and bottom bolts 17, wedge-shaped washers 18, 18 being interposed between the clamping elements 15 and 16 and the respective outer and inner surfaces of the cowling side wall, as shown in Figure 2. As is shown in Figure 3, the end of the housing 14 projects outwardly a short distance beyond the cowling side wall.

Designated at 19 is an elongated, arcuate rack member which is slidably mounted in the housing 14, the curvature of the rack member 19 corresponding to the arcuate curvature of the housing. Rigidly secured to the intermediate portion of the housing is a U-shaped bracket member 20 whose side walls 21 and 22 depend below the housing. Journaled in said side walls is the pinion shaft 23 on which is secured the pinion 24 which meshes with the rack teeth of the rack member 19. Secured to the end of the pinion shaft 23 is the knob 25, whereby the rack member 19 may be moved inwardly and outwardly relative to the housing 14 by rotating the knob 25.

Designated at 26 is a ball housing which is threadedly secured on the end of the rack member 19. The housing 26 receives the ball 27 which is rigidly secured to the end of an arcuately curved arm 28. The ball housing 26 clampingly secures the ball 27 against the recessed end 29 of the rack member 19 and frictionally holds the arm 28 in an adjusted position relative to the rack member 19. Secured to the outer end of the curved arm 28 is the rear view mirror 30 which may be thus adjusted to a desired position affording the driver of the vehicle an unobstructed view rearwardly of the vehicle. The arcuate curvature of the housing 14 and the rack member 19 assures the operator of the vehicle a clear view rearwardly thereof regardless of how far outwardly the rack member 19 is extended, the mirror being readily positioned outwardly to any desired extent by rotating the knob 25, no adjustment of the arm 28 relative to the rack member 19 being required when the rack member is moved inwardly or outwardly since the arcuate shape of the rack member and its housing assures a proper rear view over a wide range of adjustment of the device. The ball housing 26 yieldably secures the ball 27 to the end of the rack member, whereby the mirror may be readily moved when obstacles are encountered thereby, thus protecting the mirror 30 from serious injury in its outwardly extended position.

Obviously, other well known yieldable connections may be employed to secure the mirror to the end of the rack housing 19, such as a coiled spring or other yieldable element.

While a specific embodiment of an improved vehicle rear view mirror assembly has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a vehicle rear view mirror assembly, an elongated, arcuate sleeve-like housing having a rectangular cross section, said housing being adapted to be secured substantially horizontally to a side wall of a vehicle and to extend through said side wall, an arcuately shaped rack member having a rectangular cross section similar to that of the housing and being slidably positioned in said housing for telescopic movement therein, a pinion bracket secured to said housing and depending therefrom, a pinion shaft journaled transversely on said bracket below said housing, a knob secured to the end of said shaft, a pinion secured on said shaft in meshing engagement with said rack member, an arm, and means yieldably securing said arm to the end of said rack member, said means comprising a ball housing threaded on the end of said rack member, and a ball on the end of said arm received in said ball housing and yieldably clamped thereby against the end of the rack member, and a mirror secured on said arm.

References Cited in the file of this patent

UNITED STATES PATENTS 2,136,836    Bernard    Nov. 15, 1938

FOREIGN PATENTS 43,079    Denmark    Sept. 19, 1930
499,802    Great Britain    Jan. 30, 1939